US012560712B2

(12) United States Patent
Matthies et al.

(10) Patent No.: US 12,560,712 B2
(45) Date of Patent: Feb. 24, 2026

(54) METHOD AND DRIVER ASSISTANCE SYSTEM FOR CLASSIFYING OBJECTS IN THE ENVIRONMENT OF A VEHICLE

(71) Applicant: Robert Bosch GmbH, Stuttgart (DE)

(72) Inventors: Christian Matthies, Stuttgart (DE);
Albrecht Irion, Stuttgart (DE);
Christian Pampus, Leonberg (DE)

(73) Assignee: ROBERT BOSCH GMBH, Stuttgart
(DE)

( * ) Notice: Subject to any disclaimer, the term of this
patent is extended or adjusted under 35
U.S.C. 154(b) by 201 days.

(21) Appl. No.: 17/765,099

(22) PCT Filed: Aug. 21, 2020

(86) PCT No.: PCT/EP2020/073477
§ 371 (c)(1),
(2) Date: Mar. 30, 2022

(87) PCT Pub. No.: WO2021/069137
PCT Pub. Date: Apr. 15, 2021

(65) Prior Publication Data
US 2022/0397665 A1      Dec. 15, 2022

(30) Foreign Application Priority Data

Oct. 8, 2019    (DE) ..................... 10 2019 215 394.1

(51) Int. Cl.
*G01S 15/87*      (2006.01)
*G01S 15/46*      (2006.01)
*G01S 15/931*     (2020.01)

(52) U.S. Cl.
CPC ............ *G01S 15/876* (2013.01); *G01S 15/46*
(2013.01); *G01S 15/931* (2013.01); *G01S*
*2015/465* (2013.01)

(58) Field of Classification Search
CPC ...... G01S 15/876; G01S 15/46; G01S 15/931;
G01S 2015/465
See application file for complete search history.

(56) References Cited

U.S. PATENT DOCUMENTS

| | | | | |
|---|---|---|---|---|
| 2016/0325680 | A1* | 11/2016 | Curtis | ................... H04W 4/024 |
| 2018/0120429 | A1* | 5/2018 | Bialer | ..................... G01S 7/415 |
| 2018/0321377 | A1* | 11/2018 | Sudhakar | .............. G01S 13/931 |

FOREIGN PATENT DOCUMENTS

| | | |
|---|---|---|
| CN | 101464520 A | 6/2009 |
| DE | 102005032095 A1 | 1/2007 |

(Continued)

OTHER PUBLICATIONS

International Search Report for PCT/EP2020/073477, Issued Nov. 16, 2020.

(Continued)

*Primary Examiner* — Abdallah Abulaban
(74) *Attorney, Agent, or Firm* — NORTON ROSE
FULBRIGHT US LLP

(57) ABSTRACT

A method for classifying objects in the environment of a vehicle with the aid of ultrasonic sensors. In the method, ultrasonic signals are emitted, ultrasonic echoes are received from objects in the environment, and the position of a reflection point relative to the ultrasonic sensors is determined using lateration, reflection points being continuously determined and the reflection points being allocated to objects in the environment. Dispersion parameters relating to the position of the reflection points allocated to an object are determined and used as a classification criterion with regard to the type of object. A driver assistance system and a vehicle including such a driver assistance system, are also described.

13 Claims, 2 Drawing Sheets

(56)               References Cited

FOREIGN PATENT DOCUMENTS

| DE | 102007061235 | A1 | | 6/2009 | | |
|----|--------------|----|---|--------|---|---|
| DE | 102013018721 | A1 | | 6/2014 | | |
| DE | 102015101292 | A1 | | 8/2016 | | |
| DE | 102015117379 | A1 | * | 4/2017 | ............ | G01S 15/52 |
| DE | 102016118308 | A1 | * | 3/2018 | ........... | G01S 15/931 |
| DE | 102016218064 | A1 | | 3/2018 | | |
| DE | 102019105651 | A1 | | 9/2019 | | |

OTHER PUBLICATIONS

Wang Lin: "Laser Point Cloud Human-vehicle Target Recognition and Motion Information Extraction," Thesis, Uhan Univ. of Technol., Chinese Master's Theses Full-text Database: Information Science and Technology, 4 (2015), pp. 1-30.

* cited by examiner

METHOD AND DRIVER ASSISTANCE SYSTEM FOR CLASSIFYING OBJECTS IN THE ENVIRONMENT OF A VEHICLE

FIELD

The present invention relates to a method for classifying objects in the environment of a vehicle, in which ultrasonic signals are emitted with the aid of ultrasonic sensors, ultrasonic echoes are received from objects in the environment, and the position of a reflection point relative to the ultrasonic sensors is determined with the aid of lateration, and reflection points are continuously determined and the reflection points are allocated to objects in the environment. Further aspects of the present invention relate to a driver assistance system, which is designed to carry out the method, and to a vehicle which includes such a driver assistance system.

BACKGROUND INFORMATION

Modern vehicles are equipped with a multitude of driver assistance systems which support the driver of the vehicle in executing different driving maneuvers. Some conventional driver assistance systems warn the driver of hazards in the environment. The driver assistance systems require precise data about the environment of the vehicle for their function and specifically about objects that are located in the environment of the vehicle.

Ultrasound-based object localization methods in which two or more ultrasonic sensors are employed are frequently used. The ultrasonic sensors transmit ultrasonic signals and receive ultrasonic echoes reflected by objects in the environment. From the propagation time of the ultrasonic signals up to the point when a corresponding ultrasonic echo is received and also the known speed of sound, the distance between a reflecting object and the respective sensor is ascertainable. If an object is located in the field of view of more than one ultrasonic sensor, i.e., if the distance to this object is able to be determined by more than one ultrasonic sensor, then the precise position of the reflecting object relative to the sensors and/or the vehicle is also able to be ascertained via lateration algorithms. As a rule, it is sufficient if an object is seen by two ultrasonic sensors, that is to say, if two ultrasonic sensors are able to determine a distance to the object.

Apart from information about the position of an object, modern driver assistance systems require for their function also an indication of the type of object that is involved. For that reason, it is preferred to undertake a classification of the objects so that objects that are relevant with regard to a warning or a braking intervention, e.g., pedestrians, walls or trees, are able to be distinguished from objects that are irrelevant in this regard, e.g., curbs.

German Patent Application No. DE 10 2007 061 235 A1 describes a method for classifying distance data from an ultrasound-based distance detection system. Measuring signals are emitted in the method and measuring signals reflected by distant objects are intercepted again by a sensor. Distances are calculated based on the time that elapses between the emission and the receiving of the measuring signals and the known propagation speed. It is furthermore provided to correlate a statistical dispersion of the distance data with the height of the reflecting object. Large deviations in the distance values with noticeable outliers point to a large object. If such an expansive object has a smooth surface with little structure, large dispersions are furthermore noticeable in the distance values, but no obvious outliers in the measured values. If the distance values lie on a line showing minimal dispersion, then a small, elongated object such as a curb is assumed.

German patent Application No. DE 10 2013 018 721 A1 describes a method for detecting at least one parking space for a motor vehicle. Here, it is provided to set up an occupancy grid as a digital model of the environment, and the number of detections is plotted in the individual cells. In addition, dispersion centers are ascertained, which represent areas where considerable reflections of the signals emitted by the sensors occur. In addition, an object classification is performed in which ascertained dispersion centers are compared to comparison data. In this way it is possible to distinguish between a motor vehicle and other objects, for instance.

German Patent Application No. DE 10 2016 218 064 A1 describes an operating method for an ultrasonic sensor system in which ultrasonic signals reflected by objects in the environment are received and allocated to a lane. In a sequence of echo signals for temporally sequentially emitted ultrasonic signals, a search is carried out for time characteristics in the echo image. As a rule, pedestrians are characterized by reflecting only little sound energy and being in motion.

A disadvantage of the conventional methods is that a high error rate occurs in the classification of objects in the environment of a vehicle. It would therefore be desirable to utilize further parameters for the classification of the objects.

SUMMARY

A method for classifying objects in the environment of a vehicle is provided. In accordance with an example embodiment of the present invention, in the method, ultrasonic signals are emitted with the aid of ultrasonic sensors, ultrasonic echoes are received from objects in the environment, and the position of a reflection point relative to the ultrasonic sensors is determined using lateration. The determination of reflection points and an allocation of the reflection points to objects in the environment is carried out continuously. It is furthermore provided that dispersion parameters relating to the position of the reflection points allocated to an object are determined and used as a classification criterion with regard to the type of object.

Within the framework of the provided method according to the present invention, ultrasonic signals are continuously emitted and ultrasonic echoes accordingly reflected by objects are received again using at least two ultrasonic sensors whose fields of view at least partially overlap. Multiple ultrasonic sensors, e.g., two to six ultrasonic sensors, are preferably positioned as a group for this purpose, e.g., on a bumper of a vehicle. Using the known speed of sound in air, the distances between the reflecting objects in the environment of the vehicles and the respective ultrasonic sensors are then determined. If an ultrasonic echo is received by multiple ultrasonic sensors, then it may be assumed that the object reflecting the ultrasonic signals is located in the overlapping field of view of the two ultrasonic sensors. By applying a lateration algorithm, the position of the reflecting object relative to the vehicle or relative to the involved ultrasonic sensors is able to be determined. Two ultrasonic sensors that receive echoes from the object are already sufficient to determine the position in the plane.

In accordance with an example embodiment of the present invention, when performing the classification of the objects, they may be sorted into different categories such as 'low, crossable object' or 'high, non-crossable object'. In addition, a type characterization may be undertaken in which different types of objects are distinguished within the scope of the classification. For instance, a distinction is made between elongated objects such as curbs, punctiform objects such as posts or pillars, and complex objects such as pedestrians, bushes or trees.

In addition to the dispersion parameters, is preferably provided to also consider other criteria in the classification. For example, the number of echoes received for an emitted ultrasonic signal or the behavior of the measuring data, e.g., the number of echoes and the amplitudes of the echoes when the vehicle approaches the object, may be taken into account as additional criteria. The number of echoes, for instance, depends on whether the object has a clearly defined reflection point. Moreover, in connection with high objects, at least two ultrasonic echoes usually come about, a first echo being reflected by the object at a point that lies at the same height as the ultrasonic sensor, and a second echo being reflected by a transition between the object and the ground. The behavior of the received measuring data in an approach of the vehicle to the object may also provide information about the reflecting object. When approaching a wall, for example, the amplitude of the received echoes does not change or changes only slightly, while when approaching a curb, which constitutes a low object, the amplitude drops as the vehicle drives toward this object.

The determined dispersion parameters indicate the manner in which the reflection points allocated to an object are locally distributed. A mean value, a standard deviation, a variance or other conventional statistical parameters, are therefore able to be used as dispersion parameters. In this context it may be provided that outliers, i.e., individual reflection points that clearly deviate from the mean value, are no longer taken into account in the determination of the dispersion parameters. For example, it may be checked for this purpose whether a reflection point is situated farther from a central point than a multiple of the mean value, or conventional outlier tests are able to be applied.

It is preferably provided that the dispersion parameters separately indicate the dispersion of the reflection points along two directions orthogonal to each other.

As an alternative, it may be provided to determine a central point of the object by averaging the reflection points allocated to an object and to determine as dispersion parameters a portion of the reflection points that is located inside or outside a predefined radius around the central point of the object. The circle radius is able to be fixedly predefined in advance, e.g., from a range of 20 cm to 100 cm, preferably a range of 30 cm to 80 cm, most preferably a range of 40 cm to 60 cm, and be specified as 50 cm, for instance. If the radius is set as 50 cm and a punctiform object such as a post or a pillar is involved, for example, then virtually the entire portion of the reflection points will lie inside the predefined radius. In a more complex object such as a pedestrian, a bush or a tree, a great portion of the reflection points will still lie within the predefined radius, but a certain portion of the reflection points will already lie outside the radius because of a greater dispersion on account of a not well-defined position of the reflection point. In a linear object, e.g., a curb, high dispersion is noticeable so that a great portion of the reflection points lies outside the predefined radius.

Within the framework of the present method in accordance with the present invention, a bounding box is preferably determined, which indicates an area in which—with the exception of reflection points determined to be outliers—all reflection points allocated to an object are situated, the dimensions of the bounding box being determined as dispersion parameters.

Preferably, the bounding box is designed to be tolerant with regard to statistical outliers so that a great enlargement of the bounding box by a reflection point categorized as an outlier will not be incorporated into the bounding box, or at least not fully. It may be provided that a certain history of reflection points is stored prior to the initial setup of the bounding box in order to avoid that the bounding box is set up with outliers at the outset. For example, it may be provided to initially allocate at least five to ten reflection points to an object before setting up the first bounding box. After the initial setup of the bounding box, it will be updated as soon as further reflection points are added to the particular object within the framework of the present method.

The determined bounding box preferably has a longitudinal extension and a lateral extension, the longitudinal extension indicating the intensity of the dispersion along the longitudinal direction, and the lateral extension indicating the intensity of the dispersion along the lateral direction.

Alternatively or additionally, it may be provided to set up an occupancy grid for each object in order to determine the dispersion parameters, in which the cells of the occupancy grid have an occupancy value that indicates the number of reflection points allocated to the respective cells. The occupancy grid constitutes a raster in which each cell indicates the number of reflection points that were detected at a location represented by the respective cell. An occupancy value of a cell is incremented accordingly as soon as a reflection point is able to be allocated to the respective cell of the raster or occupancy grid.

Based on the occupancy values of the cells of the occupancy grid, a longitudinal extension and a lateral extension are preferably determined as dispersion parameters, the longitudinal extension indicating the intensity of the dispersion along the longitudinal direction, and the lateral extension indicating the intensity of the dispersion along the lateral direction.

By separately determining the dispersion parameters for at least two directions orthogonal to each other, e.g., a longitudinal direction and a lateral direction, it can be derived whether an object disperses uniformly or whether the dispersion in one direction is stronger than in another. It can then be assessed for each direction whether the dispersion takes place across a large area or whether the reflection points or their positions are concentrated in a small area. To this end, limits may possibly be defined for the respective directions for which the dispersion parameters are determined so that it is possible to distinguish a small dispersion from a large dispersion.

The longitudinal extension preferably runs parallel to a direction pointing away from the vehicle, and the lateral extension runs in a direction perpendicular thereto. As an alternative, it is preferred that the direction of the greatest extension of the object is determined and the lateral extension runs parallel to this direction and the longitudinal extension runs perpendicular to this direction. Alternatively, it is preferably provided to allocate an object model having a point geometry and a line geometry to the object by evaluating the relative position of the reflection points allocated to an object, and in case of a line geometry, the lateral extension runs parallel to the orientation of the line and the longitudinal extension runs perpendicular thereto.

Especially preferably, in the event that an object model is available, a bounding box is set up, which is oriented according to the determined lateral and longitudinal directions.

The provided method of the present invention may achieve a better classification of certain object types, which particularly allows for a better differentiation between curbs, pedestrians and punctiform objects such as posts or pillars. In the classification, a curb is identified by a large dispersion in the direction of the lateral extension and a low dispersion in the direction of the longitudinal extension. A punctiform object is identified by a low dispersion in the direction of the lateral extension and a low dispersion in the direction of the longitudinal extension. Objects having a complex geometry, in particular pedestrians, are identified by a large dispersion in the direction of the lateral extension and a large dispersion in the direction of the longitudinal extension. A large dispersion is distinguished from a low dispersion, for instance, by predefining a limit value for the dispersion. This limit value may be specified differently for the longitudinal extension and the lateral extension, and if the predefined limit value is exceeded, a large dispersion is assumed and if the dispersion corresponds to the limit value or lies below it, a low dispersion is assumed.

In addition, it is possible to perform a classification using the dispersion parameters determined in the previously described manner with the aid of a machine learning method. In this context, training data are used that include an allocation of a certain measured dispersion to a certain object type. The correspondingly trained models may then be used in the classification of the dispersion parameters determined within the framework of the present method.

As another option for the classification, it is possible to determine distributions of the dispersion values for the object types to be distinguished on the basis of training data. Continuous monitoring of the dispersion values of an object then makes it possible to derive probabilities for certain object types, which are used, preferably in combination with other features (such as the number and/or amplitudes of the echoes), for the final classification. Such a procedure resembles a machine learning method with the exception that the decision criterion is specified by the developer and thus is known and configurable.

A further aspect of the present invention relates to a driver assistance system which includes at least two ultrasonic sensors having at least partially overlapping fields of view and a control unit. The driver assistance system is designed and/or set up to carry out one of the methods described herein.

Since the driver assistance system is developed and/or set up to execute one of the methods, features described within the scope of one of the present methods accordingly apply to the driver assistance system, and, conversely, features described within the scope of one of the driver assistance systems apply to the method.

The driver assistance system is appropriately developed to detect objects in the environment of a vehicle with the aid of the at least two ultrasonic sensors and to perform a classification of objects in the environment of the vehicle.

The particular area in which the corresponding ultrasonic sensor is able to perceive objects is referred to as the field of view in this context. An overlapping placement of the fields of view of at least two ultrasonic sensors makes it possible for the corresponding ultrasonic echoes to be received by multiple sensors when an ultrasonic pulse is emitted. This allows for an ascertainment of a distance between the object and the vehicle or the corresponding ultrasonic sensors by more than one ultrasonic sensor so that the position of this object relative to the ultrasonic sensors or the vehicle is able to be determined with the aid of a lateration algorithm.

In addition, in accordance with the present invention, a vehicle is provided which includes one of the described driver assistance systems.

With the aid of the method for classifying objects in the environment of a vehicle according to the present invention, a new classification criterion for the classification of the objects is utilized in that the dispersion relating to the position of the reflection points allocated to an object is taken into account. The use of this new classification criterion already makes it possible to obtain information about the type of reflecting object. In addition, the new provided classification criterion, in particular in combination with conventional classification criteria such as the number of received ultrasonic echoes after an ultrasonic signal has been emitted and the behavior of the received measured values when the vehicle approaches the object, are able to be taken into consideration.

Especially within the framework of such a combination in which multiple different criteria are utilized in the classification, the new provided classification criterion with regard to the dispersion of the determined position contributes to a significant reduction of error rates, and in particular achieves a reduction of a false-positive rate in the classification of curbs and/or an improvement in the true-positive rates in the detection of pedestrians and trees.

In addition, it is possible as a result of the present method to achieve a differentiation of the object classes that goes beyond a simple classification (crossable/not crossable) and thereby makes it possible to distinguish, for instance, pedestrians, trees, posts and small-scale bushes from one another.

BRIEF DESCRIPTION OF THE DRAWINGS

Embodiments of the present invention will be described in greater detail based on the figures and the following description.

DETAILED DESCRIPTION OF EXAMPLE EMBODIMENTS

Figure 1:
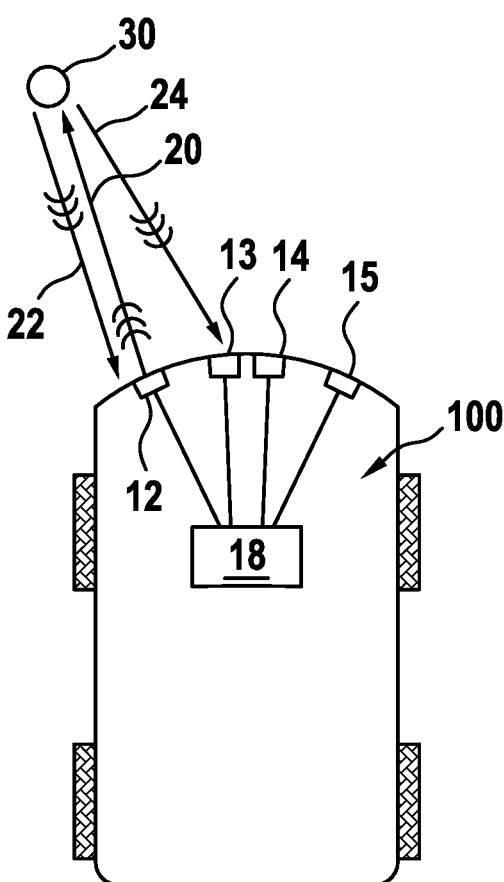
FIG. 1 shows a vehicle having a driver assistance system according to an example embodiment of the present invention.

Identical or similar elements are denoted by the same reference numerals in the following description of embodiments of the present invention, and a repeated description of these elements is dispensed with in individual cases. The figures represent the subject matter of the present invention only schematically.

FIG. 1 shows a vehicle 1, which includes a driver assistance system 100 according to the present invention. In the illustrated example, driver assistance system 100 includes four ultrasonic sensors 12, 13, 14, 15, which are all mounted at the front of vehicle 1 and connected to a control unit 18 in each case. Control unit 18 is appropriately developed to emit ultrasonic signals 20 with the aid of ultrasonic sensors 12, 13, 14, 15 and to receive ultrasonic echoes 22, 24 from objects 30 in the environment of vehicle 1.

Ultrasonic sensors 12, 13, 14, 15 are situated at the front of vehicle 1 in such a way that at least the fields of view of two ultrasonic sensors 12, 13, 14, 15 overlap at least partially. In the situation depicted in FIG. 1, object 30 is located both in the field of view of a first ultrasonic sensor 12 and in the field of view of a second ultrasonic sensor 13. In the sketched example, first ultrasonic sensor 12 emits an ultrasonic signal 20, which is reflected by object 30. Ultrasonic echo 22 received by first ultrasonic sensor 12 is denoted as a direct echo insofar as it was received by the same ultrasonic sensor 12, 13, 14, 15 that also emitted the original ultrasonic signal 20. A further ultrasonic echo 24, which is received by second ultrasonic sensor 13, is denoted as a cross echo because it was received by a different ultrasonic sensor 12, 13, 14, 15.

Figure 2:
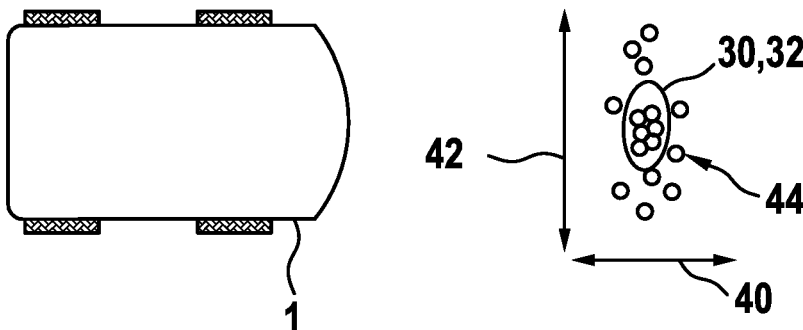
FIG. 2 shows a typical dispersion characteristic of a pedestrian.
Figure 3:
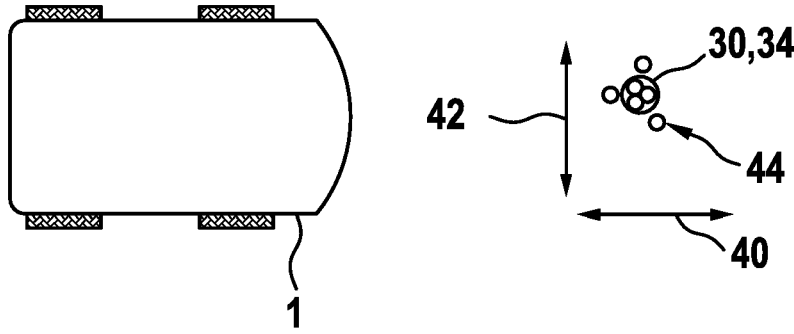
FIG. 3 shows a typical dispersion characteristic of a punctiform object.
Figure 4:
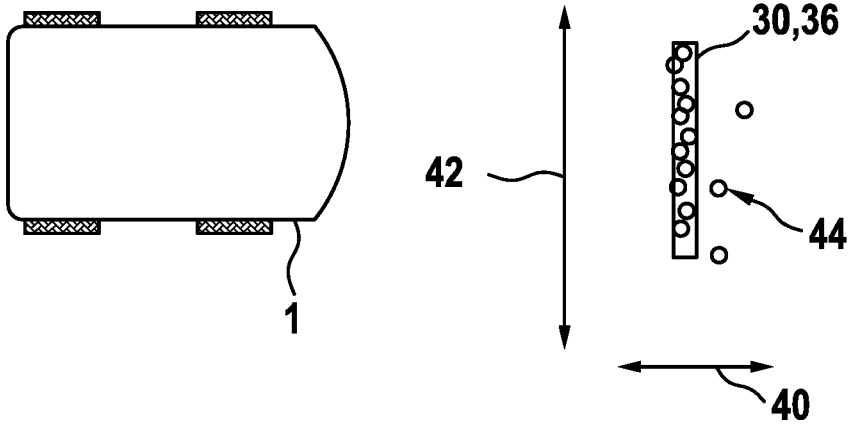
FIG. 4 shows a typical dispersion characteristic of a curb.

For the classification of object 30, it is provided to determine the position of reflection points 44, see FIGS. 2, 3 and 4, with the aid of lateration, the reflection points indicating at which point the emitted ultrasonic signal 20 was reflected by object 30. This determination is carried out continuously so that a multitude of reflection points 44 is determined. The individual determined reflection points 44 are allocated to an object 30 in each case, it being possible, for instance, to use as criteria for this purpose the distance of reflection points 44 from one another or to use an object model allocated to object 30. Such an object model represents a hypothesis of the form and extension of object 30. For example, it may be assumed as a hypothesis that object 30 involves a punctiform object 34 such as a post. In a different hypothesis it may be assumed that object 30 is a linear object such as a curb or a wall. Reflection points 44 that correspond to the assumptions of this model are then allocated to respective object 30.

It is furthermore provided in the method to examine the dispersion of the positions of reflection points 44 more closely and to determine corresponding dispersion parameters. These dispersion parameters are then used as a criterion in a classification of the type of object 30.

The following FIGS. 2, 3 and 4 show the position of the determined reflection points 44 for different typical objects 30. FIGS. 2, 3 and 4 show an object that is located in front of vehicle 1 and thus in the field of view of multiple ultrasonic sensors 12, 13, 14, 15.

FIG. 2 shows the distribution of reflection points 44 for an object 30 that involves a pedestrian 32. As may be gathered from the illustration of FIG. 2, ascertained reflection points 44 occur in great clusters at the actual position of pedestrian 32. Because of the complex form and structure of pedestrian 32, however, widely dispersed outliers are also detectable, which disperse heavily along a lateral direction 42, in particular. Reflection points 44 also disperse in a longitudinal direction, but a longitudinal extension 40 of the dispersion along the longitudinal direction is considerably lower.

For an analysis of the dispersion of reflection points 44 sketched in FIG. 2, the direction of the longest extension of object 30, for example, is able to be determined and along this direction the lateral direction be aligned with a lateral extension 42 of the dispersion. The direction of longitudinal extension 40 is consequently orthogonal thereto. Next, a bounding box is able to be set up, that is to say, a frame having a width that corresponds to the extension of the lateral dispersion, and a length that corresponds to the longitudinal extension 40 of the dispersion.

FIG. 3 exemplarily shows the dispersion of locations allocated to reflection points 44 using the example of a punctiform object 34 as an object 30. In comparison with the example of pedestrian 32 of FIG. 2, it can be seen that both longitudinal extension 40 of the dispersion along the longitudinal direction and the extension of lateral dispersion 42 along the lateral direction are low. The dispersion of reflection points 44 in the case of a punctiform object 34 is low because the point where the ultrasound is reflected is well-defined in such a punctiform object 34 and only minor deviations of reference points 44 occur as a result.

FIG. 4 sketches the position of reflection points 44 using the example of a curb 36 as object 30. As may be gathered from the illustration in FIG. 4, a curb 36 typically exhibits a broad dispersion in lateral extension 42, and no special clusters of reflection points 44 usually occur at a particular point. In addition, little dispersion along the longitudinal direction is observed so that longitudinal extension 40 of the dispersion is correspondingly low.

The present invention is not restricted to the described exemplary embodiments and the aspects emphasized therein. Instead, a multitude of variations may lie within the scope of the present invention.

What is claimed is:

1. A method for classifying objects in an environment of a vehicle, the method comprising the following steps:

emitting ultrasonic signals using ultrasonic sensors;

receiving ultrasonic echoes from objects in the environment;

determining a position of reflection points relative to the ultrasonic sensors using lateration, the reflection points being continuously determined and the reflection points being allocated to objects in the environment;

determining at least one degree of spatial dispersion of the reflection points relating to the position of the reflection points allocated to an object of the objects; and classifying the object as being one of a plurality of predefined object types based on the at least one degree of dispersion, wherein a respective static spatial form of each of the predefined object types differs from the respective static spatial forms of all of the other ones of the predefined object types with respect to a respective static spatial form, the respective static spatial forms each being a respective form of a space occupied in a non-dynamic state of the respective object type;

wherein:

(i) a bounding box is determined, which indicates an area in which, with the exception of reflection points determined to be outliers, all reflection points allocated to the object are situated, the dimensions of the bounding box being determined for characterizing the at least one degree of dispersion;

(ii) the bounding box has a longitudinal extension and a lateral extension, the longitudinal extension indicating an intensity of a dispersion along a longitudinal direction, and the lateral extension indicating an intensity of the dispersion along a lateral direction;

(iii) (a) the longitudinal extension runs parallel to a direction pointing away from the vehicle, and the lateral extension runs perpendicular to the longitudinal extension, or (b) a direction of a greatest extension of the object is determined, and the lateral extension runs parallel to the direction and the longitudinal extension runs perpendicular to the direction, or (c) an object model having a point geometry or a line geometry is allocated to the object by evaluating a relative position of the reflection points allocated to the object; and (iv) in the classification, a curb is identified by a large dispersion in a direction of the lateral extension and a low dispersion in a direction of the longitudinal extension, a punctiform object is identified by a low dispersion in the direction of the lateral extension and a low dispersion in the direction of the longitudinal extension, and a pedestrian is identified by a large dispersion in the direction of the lateral extension and a large dispersion in the direction of the longitudinal extension.

2. The method as recited in claim 1, wherein a central point of the object is determined by averaging the reflection points allocated to the object, and a percentage of a portion of the reflection points that is located (a) inside a predefined radius around the central point of the object or (b) outside the predefined radius is determined as a dispersion parameter used for characterizing the at least one degree of dispersion.

3. The method as recited in claim 1, wherein an occupancy grid is set up for each of the objects in order to determine the at least one degree of dispersion, and cells of the occupancy grid each have an occupancy value that indicates a number of reflection points allocated to the cell.

4. The method as recited in claim 3, wherein based on the occupancy values of the cells of the occupancy grid, a longitudinal extension and a lateral extension are determined as dispersion parameters characterizing the at least one degree of dispersion, the longitudinal extension indicating an intensity of a dispersion along a longitudinal direction and the lateral extension indicating an intensity of the dispersion along a lateral direction.

5. The method as recited in claim 1, wherein the object model having a line geometry is allocated to the object, and wherein the lateral extension runs parallel to an orientation of the line and the longitudinal extension runs perpendicular thereto.

6. A driver assistance system, comprising:
at least two ultrasonic sensors having at least partially overlapping fields of view; and
a control unit;
wherein:
(i) to classify objects in an environment of a vehicle, the driver assistance system configured to:
emit ultrasonic signals using the ultrasonic sensors;
receive ultrasonic echoes from objects in the environment;
determine a position of reflection points relative to the ultrasonic sensors using lateration, the reflection points being continuously determined and the reflection points being allocated to objects in the environment;
determine at least one degree of spatial dispersion of the reflection points relating to the position of the reflection points allocated to an object of the objects; and
classify the object as being one of a plurality of predefined object types based on the at least one degree of dispersion, wherein a respective static spatial form of each of the predefined object types differs from the respective static spatial forms of all of the other ones of the predefined object types with respect to a respective static spatial form, the respective static spatial forms each being a respective form of a space occupied in a non-dynamic state of the respective object type;
(ii) a bounding box is determined, which indicates an area in which, with the exception of reflection points determined to be outliers, all reflection points allocated to the object are situated, the dimensions of the bounding box being determined for characterizing the at least one degree of dispersion;
(iii) the bounding box has a longitudinal extension and a lateral extension, the longitudinal extension indicating an intensity of a dispersion along a longitudinal direction, and the lateral extension indicating an intensity of the dispersion along a lateral direction;
(iv) (a) the longitudinal extension runs parallel to a direction pointing away from the vehicle, and the lateral extension runs perpendicular to the longitudinal extension, or (b) a direction of a greatest extension of the object is determined, and the lateral extension runs parallel to the direction and the longitudinal extension runs perpendicular to the direction, or (c) an object model having a point geometry or a line geometry is allocated to the object by evaluating a relative position of the reflection points allocated to the object; and
(v) in the classification, a curb is identified by a large dispersion in a direction of the lateral extension and a low dispersion in a direction of the longitudinal extension, a punctiform object is identified by a low dispersion in the direction of the lateral extension and a low dispersion in the direction of the longitudinal extension, and a pedestrian is identified by a large dispersion in the direction of the lateral extension and a large dispersion in the direction of the longitudinal extension.

7. A vehicle, including a driver assistance system, the driver assistance system comprising:
at least two ultrasonic sensors having at least partially overlapping fields of view; and
a control unit;
wherein:
(i) to classify objects in an environment of a vehicle, the driver assistance system configured to:
emit ultrasonic signals using the ultrasonic sensors;
receive ultrasonic echoes from objects in the environment;
determine a position of reflection points relative to the ultrasonic sensors using lateration, the reflection points being continuously determined and the reflection points being allocated to objects in the environment; and
determine at least one degree of spatial dispersion of the reflection points relating to the position of the reflection points allocated to an object of the objects; and
classify the object as being one of a plurality of predefined object types based on the at least one degree of dispersion, wherein a respective static spatial form of each of the predefined object types differs from the respective static spatial forms of all of the other ones of the predefined object types with respect to a respective static spatial form, the respective static spatial forms each being a respective form of a space occupied in a non-dynamic state of the respective object type;
(ii) a bounding box is determined, which indicates an area in which, with the exception of reflection points determined to be outliers, all reflection points allocated to the object are situated, the dimensions of the bounding box being determined for characterizing the at least one degree of dispersion;
(iii) the bounding box has a longitudinal extension and a lateral extension, the longitudinal extension indicating an intensity of a dispersion along a longitudinal direction, and the lateral extension indicating an intensity of the dispersion along a lateral direction;

(iv) (a) the longitudinal extension runs parallel to a direction pointing away from the vehicle, and the lateral extension runs perpendicular to the longitudinal extension, or (b) a direction of a greatest extension of the object is determined, and the lateral extension runs parallel to the direction and the longitudinal extension runs perpendicular to the direction, or (c) an object model having a point geometry or a line geometry is allocated to the object by evaluating a relative position of the reflection points allocated to the object; and (v) in the classification, a curb is identified by a large dispersion in a direction of the lateral extension and a low dispersion in a direction of the longitudinal extension, a punctiform object is identified by a low dispersion in the direction of the lateral extension and a low dispersion in the direction of the longitudinal extension, and a pedestrian is identified by a large dispersion in the direction of the lateral extension and a large dispersion in the direction of the longitudinal extension.

8. The method as recited in claim 1, wherein the determination of the at least one degree of spatial dispersion includes determining, for each object, at least two dispersion parameters indicating a dispersion of the reflection points along longitudinal and lateral directions that are orthogonal to each other.

9. The method as recited in claim 8, wherein the classification is made based on a statistical parameter selected from the group consisting of mean, standard deviation, and variance of the reflection points.

10. The method as recited in claim 1, wherein the classifying comprises comparing the at least one degree of dispersion to reference values associated with different predefined object types.

11. The method as recited in claim 10, wherein the reference values are determined empirically from a training dataset of objects with known types and corresponding dispersion parameters.

12. The method as recited in claim 11, wherein the training dataset includes a plurality of example objects each of a different predefined object type and having a distinct statistical distribution of its determined reflection points.

13. The method as recited in claim 1, wherein the at least one degree of spatial dispersion of the reflection points is of reflection points reflected at a same point in time.

* * * * *